April 7, 1925.
I. F. DE TURK
1,532,477
GAUGE ATTACHMENT FOR FUEL TANKS
Filed Nov. 22, 1922
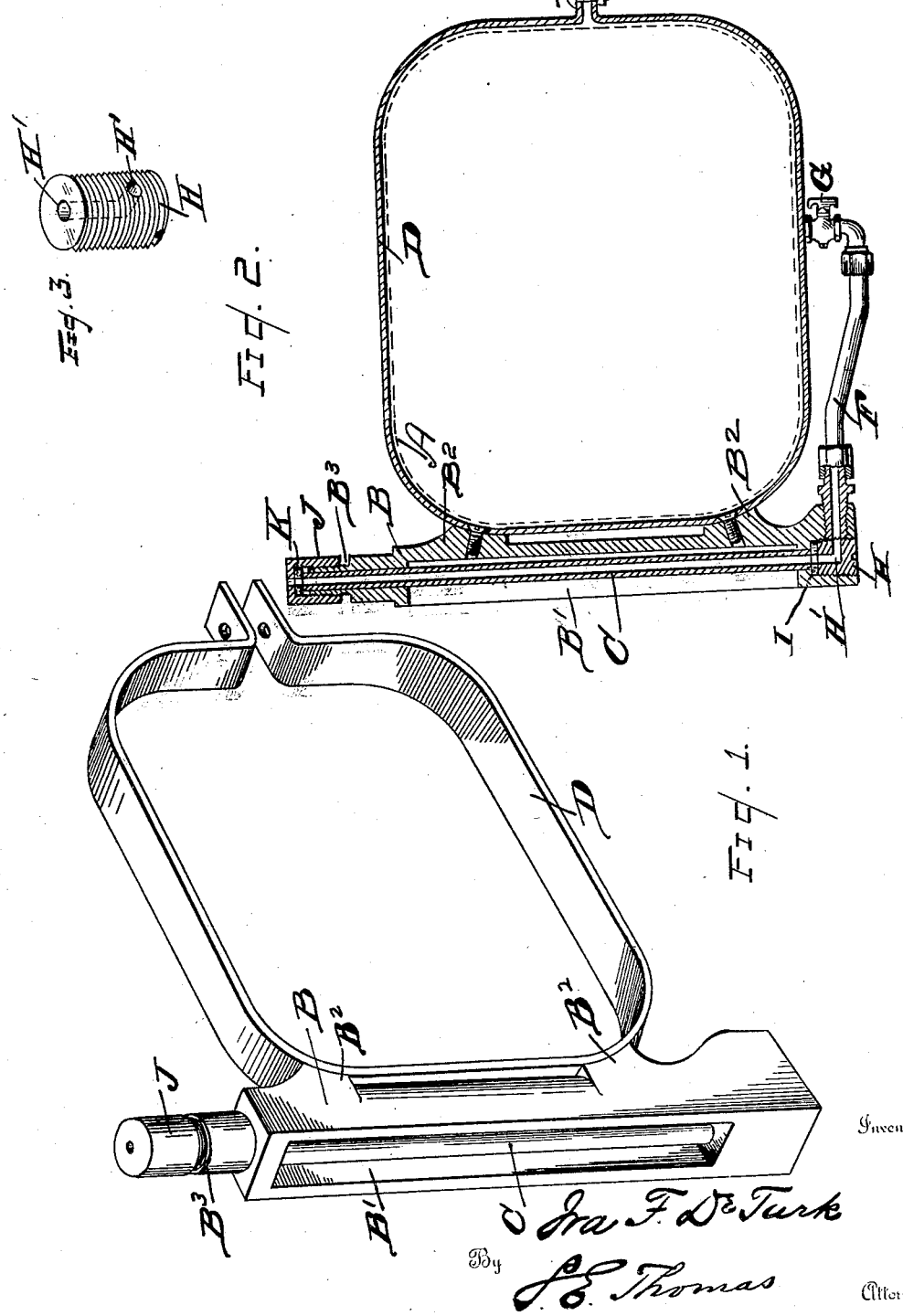

Patented Apr. 7, 1925.

1,532,477

UNITED STATES PATENT OFFICE.

IRA F. DE TURK, OF DETROIT, MICHIGAN, ASSIGNOR TO CLARENCE W. WASS, OF DETROIT, MICHIGAN.

GAUGE ATTACHMENT FOR FUEL TANKS.

Application filed November 22, 1922. Serial No. 602,533.

*To all whom it may concern:*

Be it known that I, IRA F. DE TURK, citizen of the United States, residing at Detroit, county of Wayne, State of Michigan, have invented a certain new and useful Improvement in Gauge Attachments for Fuel Tanks, and declare the following to be a full, clear, and exact description of the same, such as will enable others skilled in the art to which it pertains to make and use the same, reference being had to the accompanying drawings, which form a part of this specification.

My invention relates to a gasoline gauge attachment for liquid fuel tanks shown in the accompanying drawings and more particularly described in the following specification and claims.

The primary object of my invention is to provide a simple and inexpensive gauge attachment for liquid fuel tanks which may be readily installed by the owner of the car at a minimum expense and without the necessity of employing skilled labor.

A further object of the invention is to provide means whereby the gauge may be readily cut-off from the tank in the event of the gauge glass being broken.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanaying this specification:

Figure 1 is a perspective view of the device detached from a liquid fuel tank.

Figure 2 is a vertical cross-sectional view through the device with parts in elevation showing a fuel tank in dotted lines.

Figure 3 is a perspective view of a cut-off plug adapted to establish or to cut-off the connection between the gauge glass and the tank.

Referring now to the letters of reference placed upon the drawings:—

A denotes a fuel tank shown in dotted lines in Figure 2. B indicates a casting having a longitudinal recess $B^1$ adapted to partially enclose a gauge glass C supported in the upper and lower end walls of the casting. Secured to lugs $B^2$, $B^2$, projecting from the back of the casting is a metallic strap D for securing the casting to a fuel tank A, by means of a bolt $D^1$ extending through the laterally projecting ends of the strap—see Figure 2 of the drawings.

F denotes a pipe connection controlled by a stop-cock G between the liquid fuel tank and the lower end of the casting. H indicates a rotatable plug screwed into the lower end of the casting provided with a port $H^1$ adapted to connect the pipe connection F with the gauge glass C which may be cut-off by a partial rotation of the plug.

I designates a cork-washer between the plug H and the lower end of the gauge glass to insure a tight joint at this point. Screwed to a nipple $B^3$ projecting upwardly from the casting B is a perforated cap J,—fitted with a cork-washer K adapted to bear upon the upper end of the gauge glass C,—it being apparent that upon a proper adjustment of the cap a tight joint will be insured against leakage at each end of the gauge glass.

Having now indicated the several parts by reference letters the construction and operation of my invention will be readily understood.

To install the device, a plug usually provided in the lower wall of the fuel tank, is first removed and the stop-cock G inserted in its place. The casting B is then secured to the tank by means of the strap D and the pipe connection established between the stop-cock and the casting as previously described.

In the event of the gauge glass breaking the flow of gasoline to the casting may be cut-off by a partial rotation of the screw plug H, or the stop-cock beneath the tank.

Having thus described my invention what I claim is:

1. In a device of the character described, a fuel tank, a casting recessed to receive and expose a gauge glass and on its rear side provided with spaced lugs intermediate the ends thereof, a gauge glass supported in the upper and lower ends of the casting, a flexible strap secured intermediate its ends at spaced points to said lugs of the casting and extending horizontally laterally from the casting within the horizontal planes of the ends of the casting, means whereby to join the ends of the strap to secure the strap and the casting to the fuel tank with the strap in embracing relation with the tank, a pipe connection between the casting and the fuel tank, an exteriorly screw threaded cylindrical shaped plug rotatably mounted in the casting adjacent the outer end of the connection of the pipe with the casting and below the lower side of said flexible strap and provided with a port whereby to establish communication between the tank and the gauge glass by way of said pipe connection.

2. In a device of the character described, a fuel tank, a casting having closed side and rear walls and an open front to expose a gauge glass, means to secure said casting to the tank, a gauge glass supported in the upper and lower ends of the casting and visible through the front only, a pipe connection between the lower end wall of the casting and the fuel tank and extending from the rear wall of the casting under the tank; and a rotatable plug screwed into the casting from the lower end wall thereof adjacent the outer end of said pipe connection and provided with a port and operable from the underside of the casting, whereby to establish a passage for the flow of fuel between the tank and the gauge glass by way of said pipe connection or whereby the passage may be cut off as required.

In testimony whereof, I sign this specification in the presence of two witnesses.

IRA F. De TURK.

Witnesses:
S. E. THOMAS,
JOHN CONSIDINE.